US008589512B2

(12) United States Patent
Ruiz-Velasco et al.

(10) Patent No.: US 8,589,512 B2
(45) Date of Patent: *Nov. 19, 2013

(54) APPLICATION LAUNCHER SYSTEMS, METHODS, AND APPARATUSES

(75) Inventors: Enrique Ruiz-Velasco, Flower Mound, TX (US); Prasad Raella, Irving, TX (US); Manish Verma, Bangalore (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/248,888

(22) Filed: Sep. 29, 2011

(65) Prior Publication Data
US 2012/0023194 A1    Jan. 26, 2012

Related U.S. Application Data

(63) Continuation of application No. 12/347,795, filed on Dec. 31, 2008, now Pat. No. 8,069,247.

(60) Provisional application No. 61/119,647, filed on Dec. 3, 2008.

(51) Int. Cl.
*G06F 9/48* (2006.01)
*G06F 15/16* (2006.01)
*H04N 7/173* (2011.01)

(52) U.S. Cl.
USPC ........... 709/217; 709/223; 709/225; 709/232; 718/104; 718/105; 725/132; 725/110; 725/112; 717/178; 726/3; 726/14; 726/15

(58) Field of Classification Search
USPC ......... 709/217, 201, 245, 247, 238, 240, 225, 709/232
See application file for complete search history.

(56) References Cited

U.S. PATENT DOCUMENTS

| 8,069,247 | B2 * | 11/2011 | Ruiz-Velasco et al. | 709/226 |
|---|---|---|---|---|
| 2002/0065919 | A1 * | 5/2002 | Taylor et al. | 709/226 |
| 2004/0237082 | A1 * | 11/2004 | Alcazar et al. | 717/174 |
| 2006/0075224 | A1 * | 4/2006 | Tao | 713/164 |
| 2007/0112900 | A1 * | 5/2007 | Arrouye et al. | 707/205 |
| 2007/0143379 | A1 * | 6/2007 | i Dalfo et al. | 707/205 |
| 2008/0127220 | A1 * | 5/2008 | Morris | 719/320 |
| 2009/0241104 | A1 * | 9/2009 | Amiga et al. | 717/174 |

* cited by examiner

*Primary Examiner* — Jude Jean Gilles

(57) ABSTRACT

An exemplary method includes detecting a request to launch an application on a device, accessing metadata associated with the application over a network, using the metadata to determine whether sufficient resources are available to launch the application on the device, and performing at least one action based on said determination. The at least one action may include launching the application on the device when sufficient resources are available or blocking a launch of the application on the device when sufficient resources are not available. In certain embodiments, the method is performed by the device. In certain embodiments, the device includes a set-top box configured to access a media service over the network. Corresponding methods, systems, apparatuses, and computer-readable media are also disclosed.

20 Claims, 15 Drawing Sheets

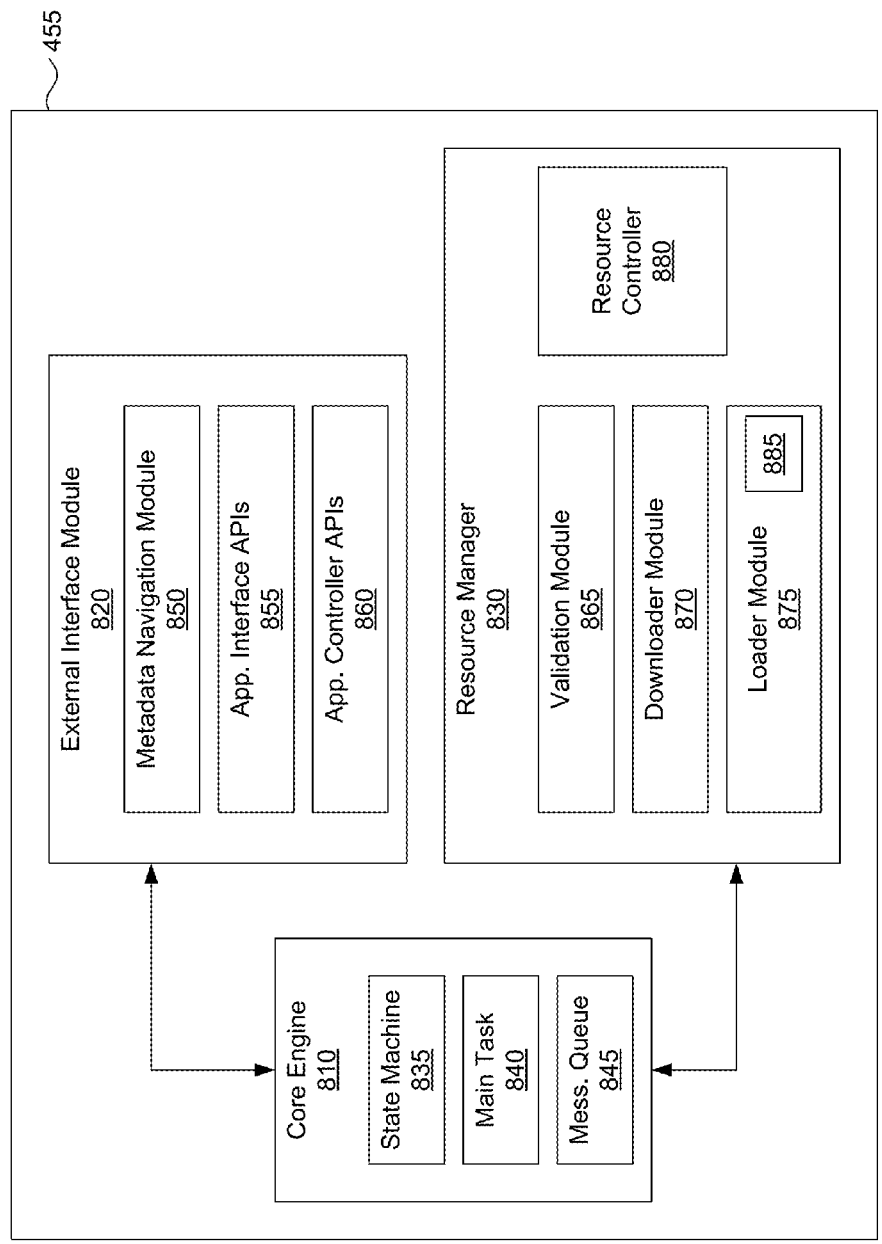

APPLICATION LAUNCHER SYSTEMS, METHODS, AND APPARATUSES

RELATED APPLICATIONS

The present application claims priority under 35 U.S.C. §120 to U.S. patent application Ser. No. 12/347,795 by Enrique Ruiz-Velasco et al., filed on Dec. 31, 2008 and entitled APPLICATION LAUNCHER SYSTEMS, METHODS, AND APPARATUSES, now allowed, which claims priority under 35 U.S.C. §119(e) to U.S. Provisional Patent Application No. 61/119,647 by Enrique Ruiz-Velasco et al., filed on Dec. 3, 2008, and entitled APPLICATION LAUNCHER SYSTEMS AND METHODS. These applications are incorporated herein by reference in their respective entireties.

BACKGROUND INFORMATION

A set-top box ("STB") is typically used by an end user to access media services and content provided over a media network such as a subscriber television network. Conventional STBs have limited resources, however. Typically, STB resources, such as memory and processing resources, are dedicated to operations of a main application resident on an STB. This significantly limits the ability of an STB to compile and/or run other applications, especially applications that require a virtual machine and/or an interpreter to be run on the STB.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

FIG. 8 illustrates exemplary components of an application launcher module.

DETAILED DESCRIPTION OF PREFERRED EMBODIMENTS

Exemplary application launcher systems, methods, and apparatuses are disclosed herein. An exemplary method includes detecting a request to launch an application (e.g., a software application) on a device, accessing metadata associated with the application over a network, using the metadata to determine whether sufficient resources are available to launch the application on the device, and performing at least one action based on said determination. The at least one action may include launching the application on the device when sufficient resources are available or blocking a launch of the application on the device when sufficient resources are not available. In certain embodiments, the method is performed by the device. In certain embodiments, the device includes a set-top box configured to access a media service (e.g., a television service) over the network.

Components and functions of exemplary application launcher systems, methods, and apparatuses will now be described in more detail.

Figure 1:
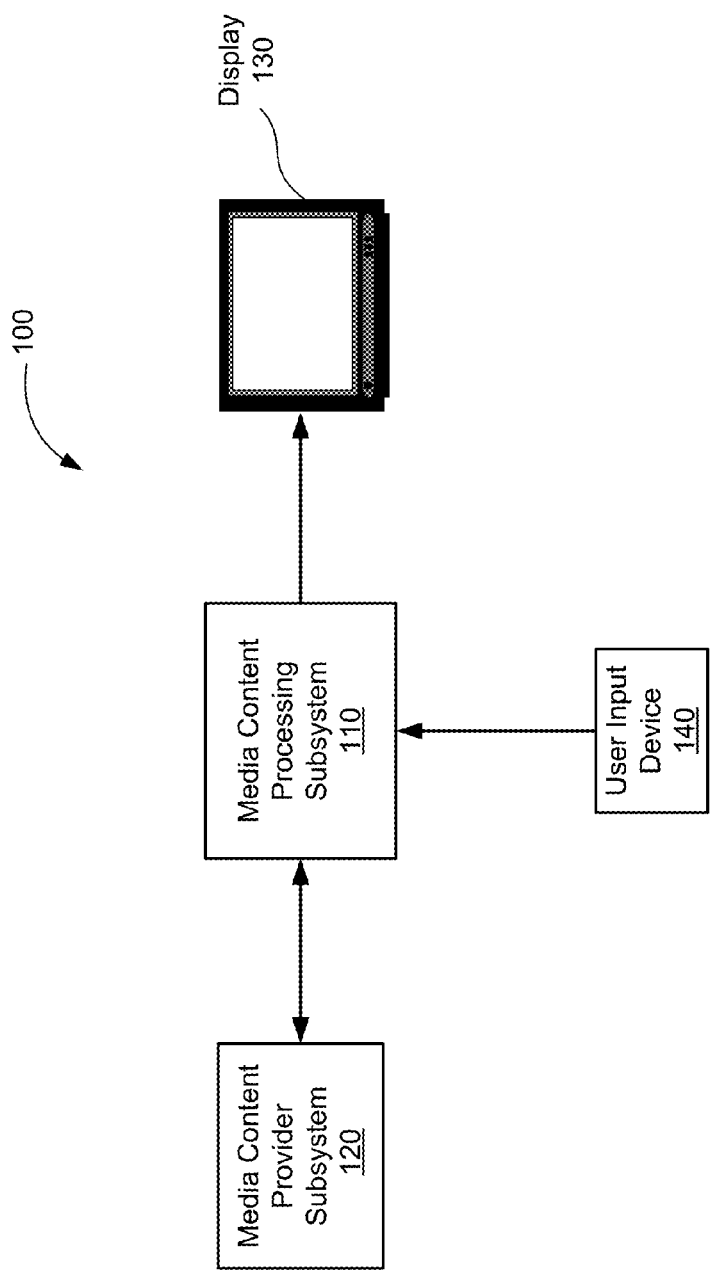
FIG. 1 illustrates an example of a media content access system.

FIG. 1 illustrates an exemplary media content access system 100 (or simply "system 100"). System 100 may include a media content processing subsystem 110, media content provider subsystem 120, display 130, and user input device 140 communicatively coupled to one another as shown in FIG. 1. Media content processing subsystem 110 may be configured to communicate with and receive a signal and/or data stream containing data representative of a media service and/or media content from media content provider subsystem 120. Media content processing subsystem 110 and media content provider subsystem 120 may communicate using any suitable communication technologies, devices, networks, media, and protocols supportive of remote data communications.

Figure 2:
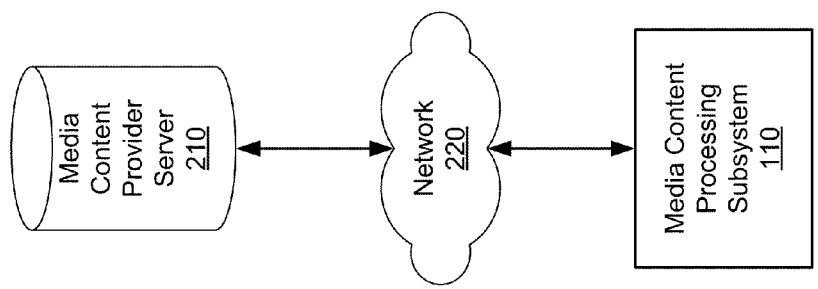
FIG. 2 illustrates an exemplary media content provider network.

For example, as shown in FIG. 2, media content provider subsystem 120 may include or be implemented on at least one media content provider server 210 configured to communicate with media content processing subsystem 110 over a network 220 (and communications links thereto). Network 220 may include one or more networks or types of networks capable of carrying communications and/or data signals between media content provider server 210 and media content processing subsystem 110. For example, network 220 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Media content processing subsystem 110 and media content provider server 210 may communicate over network 220 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Real Time Protocol ("RTP"), User Datagram Protocol ("UDP"), out-of-band ("OOB") communications, Ethernet, and any other suitable communications technologies, devices, media, and protocols.

Returning to FIG. 1, media content processing subsystem 110 may be configured to process a media content stream received from media content provider subsystem 120. The processing may include causing media content included in the stream to be presented for experiencing (e.g., viewing) by a user. Presentation of the media content may include, but is not limited to, displaying, playing back, or otherwise presenting the media content, or one or more components of the media content, such that the media content may be experienced by the user. For example, media content processing subsystem 110 may provide one or more signals to display 130 (e.g., a television screen, computer monitor, etc.) such that the display 130 may present media content for experiencing by the user.

As shown in FIG. 1, and as will be described in more detail below, media content processing subsystem 110 may be at least partially controlled by user input device 140 (e.g., a remote control device). In certain examples, user input device 140 may include one or more input mechanisms by which a user may utilize and/or control features and/or services provided by media content processing subsystem 110.

Figure 3:
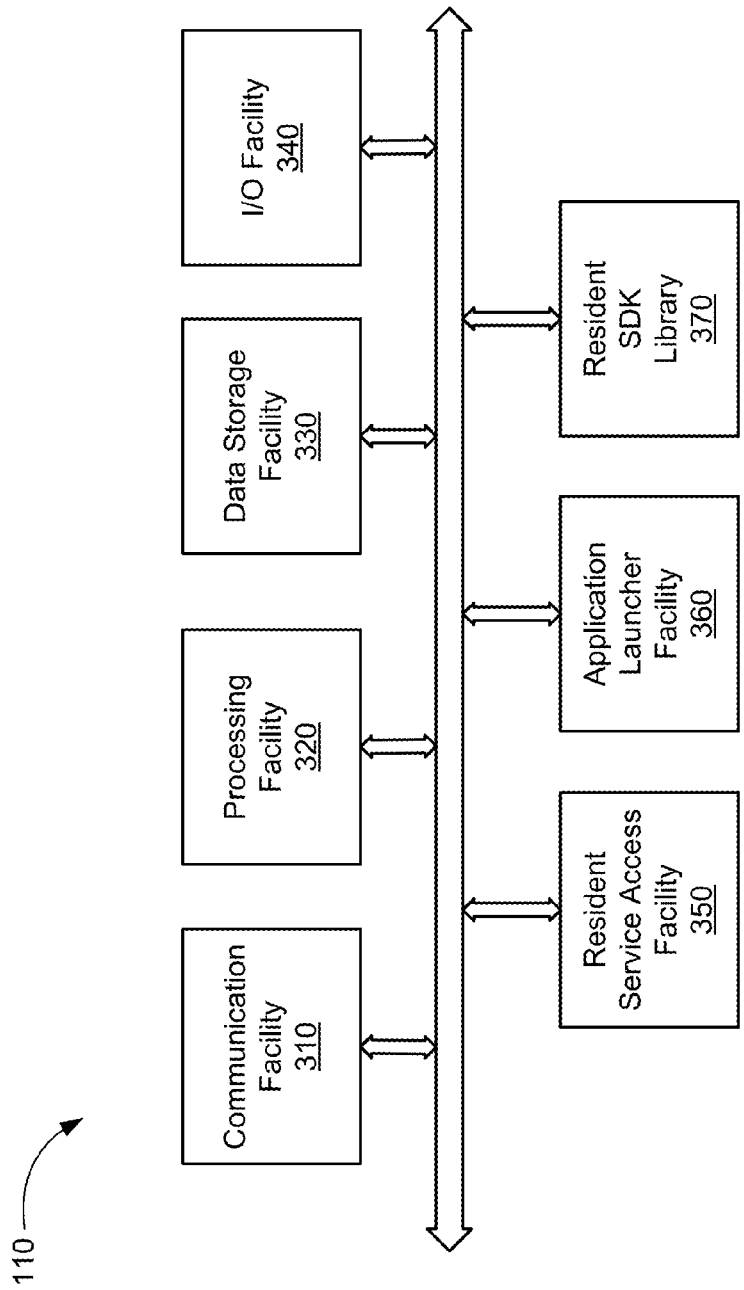
FIG. 3 illustrates an exemplary media content processing subsystem.

Exemplary components, features, operations, and implementations associated with media content processing subsystem 110 will now be described. FIG. 3 illustrates exemplary components of media content processing subsystem 110 (or simply "processing subsystem 110"). As shown in FIG. 3, processing subsystem 110 may include a communication facility 310, processing facility 320, data storage facility 330, input/output ("I/O") facility 340, resident service access facility 350, application launcher facility 360, and resident software development kit ("SDK") library 370. The components of system 100 may communicate with one another, including sending data to and receiving data from one another, using any suitable communication technologies.

In certain embodiments, processing subsystem 110 or one or more components of processing subsystem 110 may include any computer hardware and/or computer-implemented instructions (e.g., software, firmware, and/or middleware), or combinations of computer-implemented instructions and hardware, configured to perform one or more of the processes described herein. In particular, it should be understood that processing subsystem 110 may be implemented on one physical computing device or may be implemented on more than one physical computing device. Accordingly, processing subsystem 110 may include any one of a number of computing devices, and may employ any of a number of computer operating systems.

Accordingly, one or more of the processes described herein may be implemented at least in part as instructions executable by one or more computing devices. In general, a processor (e.g., a microprocessor) receives instructions, from a computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks, flash memory, and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the components illustrated in FIG. 3 are not intended to be limiting. Additional or alternative components may be used in other embodiments. Components of the processing subsystem 110 shown in FIG. 3 will now be described in additional detail.

Communication facility 310 may be configured to communicate with one or more external devices, including one or more external sources of media content. In particular, communication facility 310 may be configured to communicate with media content provider subsystem 120, including sending and/or receiving communications signals, content, and/or data to/from media content provider subsystem 120. For example, communication facility 310 may be configured to receive transmitted data representative of media content in any acceptable format from media content provider subsystem 120.

Typically, media content provider subsystem 120 may transmit (e.g., broadcast, multicast, or narrowcast) one or more data streams containing data representative of one or more media content instances. Communication facility 310 may receive such data streams such that the data representative of the media content instances contained therein may be processed by processing subsystem 110. To this end, communication facility 310 may include any device (e.g., one or more signal tuners or receivers), logic, and/or other technologies suitable for receiving signals, data streams, and/or data representative of media content. Communication facility 310 may be configured to interface with any suitable communication media, protocols, and formats, including any of those mentioned above.

Communication facility 310 may also be configured to transmit requests for data such as data representative of one or more applications and/or metadata associated with the application(s) to an external source. Additionally or alternatively, communication facility 310 may be configured to receive data representative of one or more applications and/or metadata associated with the application(s) from an external source. For example, communication facility 310 may be configured to perform one or more communication operations in association with requesting, accessing, and/or downloading data (e.g., application data and/or application metadata) from media content provider subsystem 120 and/or another external source.

Processing facility 320 may include one or more processors and may be configured to execute and/or direct execution of one or more of the processes or operations described herein. Processing facility 320 may direct execution of operations in accordance with computer-executable instructions such as may be stored in data storage facility 330 or another computer-readable medium. As an example, processing facility 320 may be configured to process data, including demodulating, decoding, and parsing acquired data (e.g., data representative of media content received from media content provider subsystem 120 by communication facility 310), and encoding and modulating data for transmission by communication facility 310.

Data storage facility 330 may include one or more data storage media, devices, and/or configurations and may employ any type, form, and combination of data storage media and/or device. For example, data storage facility 330 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein (e.g., data representative of media content and/or one or more applications), may be temporarily and/or permanently stored in data storage facility 330.

I/O facility 340 may be configured to receive user input and provide user output and may include any hardware, firmware, middleware, software, or combination thereof supportive of input and output capabilities. For example, I/O facility 340 may include one or more devices for capturing user input, including, but not limited to, a microphone, speech recognition technologies, keyboard or keypad, touch screen component (e.g., touch screen display), receiver (e.g., an RF or infrared receiver), and one or more input buttons.

I/O facility 340 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O facility 340 is configured to provide graphical data to display 130 for presentation to a user.

Resident service access facility 350 (or simply "resident facility 350") may be configured to execute and/or direct execution of one or more operations related to accessing a service and/or associated content. For instance, a media service, media content, a communication service, communication content, or other service and related content may be accessed by resident facility 350. As an example, resident facility 350 may be configured to provide one or more user interfaces configured to facilitate accessing of media services and/or content provided by media content provider subsystem 120. Examples of such interfaces may include, but are not limited to, interactive program guide, menu, and media recording graphical user interfaces.

Application launcher facility 360 may be configured to control launching of one or more applications (e.g., software applications) by processing subsystem 110. As described herein, application launcher facility 360 may coordinate application launches and terminations, and resources associated with application launches and terminations. As used herein, an application may include any set of computer-readable instructions tangibly embodied in at least one computer-readable medium and configured to be executed by a computing device such as processing subsystem 110. Examples of applications include, but are not limited to, a search tool (e.g., a search tool for use in an operational context of resident service access facility 350), an interactive game, a user interface, a widget, a standalone software program, and a software program for use in an operational context of resident service access facility 350.

Resident SDK library 370 (or simply "resident library 370") may include a set of defined application program interfaces ("APIs") configured to provide applications running on processing subsystem 110 with access to resources of the processing subsystem 110. Examples of such resources may include, but are not limited to, hardware, software, firmware, middleware, memory, processing, data type, operating system, graphics, tuner, and network access resources. In certain embodiments, resident SDK library 370 may be part of resident service access facility 350. Resident SDK library 370 is described in more detail further below.

Figure 4:
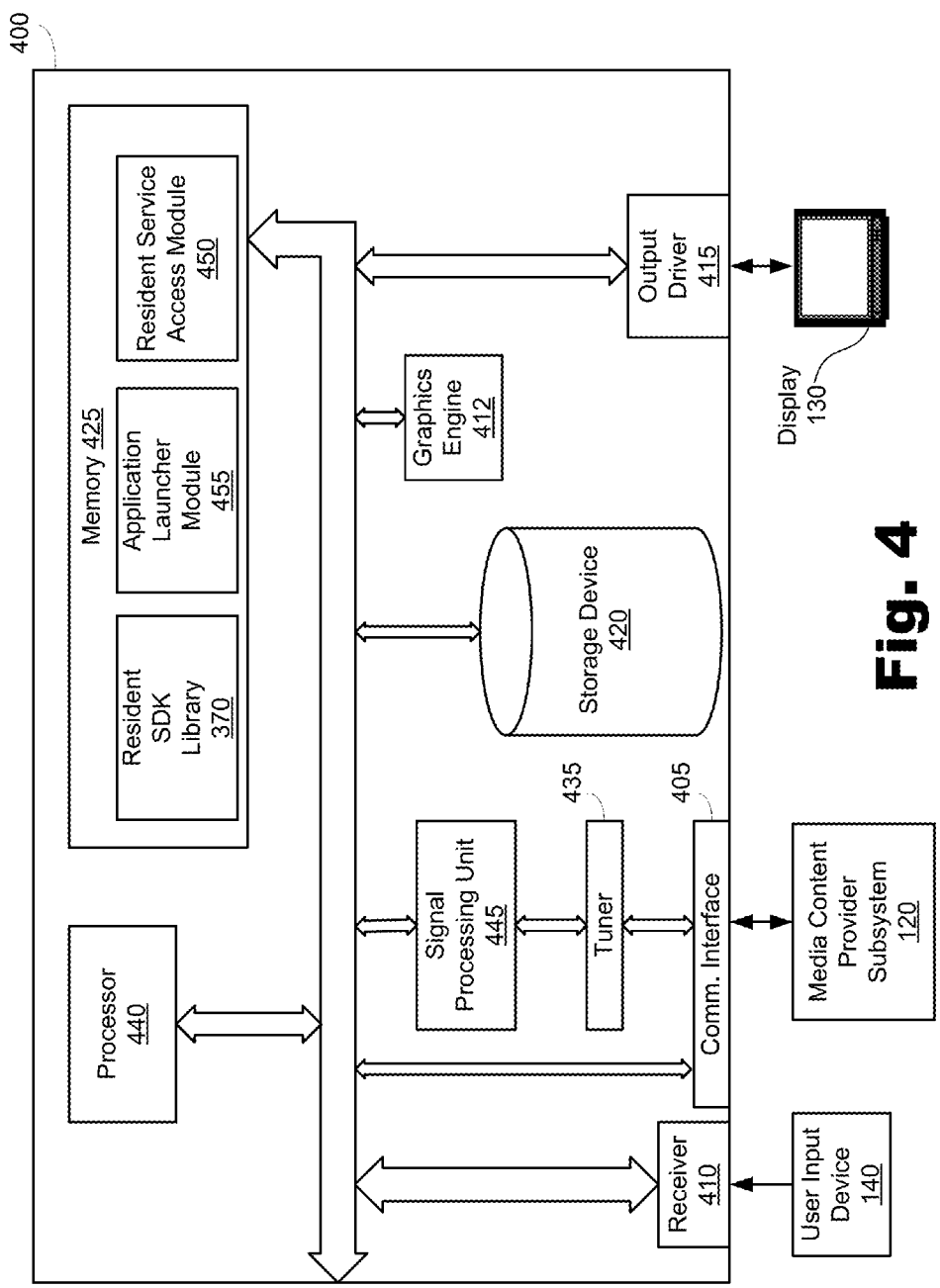
FIG. 4 illustrates an exemplary device implementation of the media content processing subsystem of FIG. 3.

Processing subsystem 110 and/or components of processing subsystem 110 may be implemented as may suit a particular application. FIG. 4 illustrates an exemplary device 400 having processing subsystem 110 implemented thereon.

Device 400 may include one or more of the components of processing subsystem 110 shown in FIG. 4 and may be configured to perform one or more of the processes and/or operations described herein. Device 400 may include, but is not limited to, a media content processing device, communications device, mobile device (e.g., a mobile phone device), handheld device, personal computer, phone device (e.g., Verizon Hub device), personal-digital assistant device, set-top box, gaming device, digital video recording ("DVR") device (e.g., a personal video recording ("PVR") device), a television device, and/or any device configured to perform one or more of the processes and/or operations described herein. In certain exemplary embodiments, device 400 includes a set-top box configured to access a media service and/or content transmitted by media content provider subsystem 120.

As shown in FIG. 4, device 400 may include a communication interface 405 configured to receive content and/or data (e.g., media content, application data, and/or application metadata) in any acceptable format from media content provider subsystem 120 or from any other suitable external source. Communication interface 405 may include any device, logic, and/or other technologies suitable for receiving signals and/or data representative of media content and/or other types of content or data. Communication interface 405 may be configured to interface with any suitable communication media, protocols, and formats, including any of those mentioned above.

Device 400 may also include a receiver 410 configured to receive user input signals from user input device 140. User input device 140 may include, for example, a remote control device or any other suitable input device and may be configured to communicate with receiver 410 via a wireless link, electrical connection, or any other suitable communication link.

Figure 5:
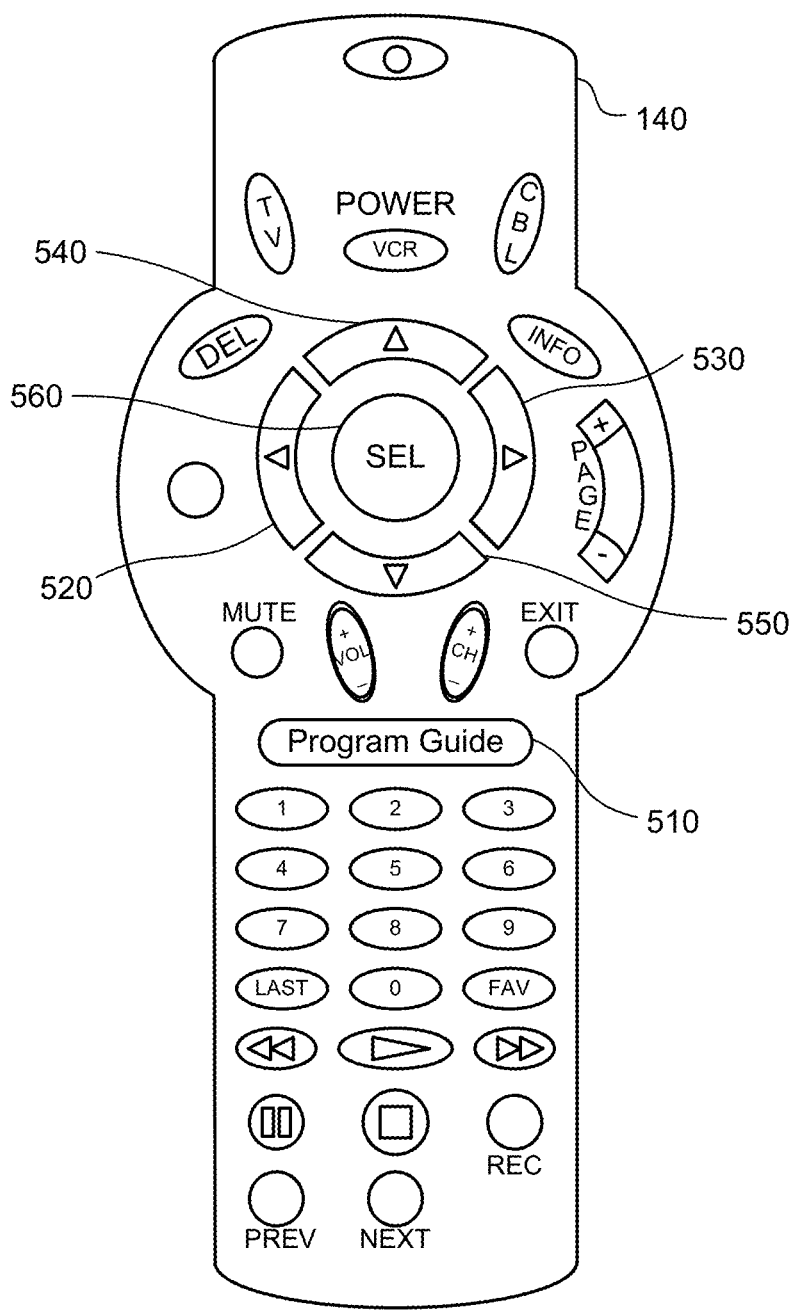
FIG. 5 illustrates an exemplary remote control user input device.

An exemplary remote control user input device 140 is illustrated in FIG. 5. In some examples, input device 140 may be configured to facilitate a user controlling operations of processing subsystem 110, including controlling options for experiencing media content, viewing program guide data, and scheduling recordings of media content. For instance, a program guide button 510 may be configured to evoke a presentation of a program guide GUI on display 130. A left button 520, right button 530, up button 540, down button 550, and select button 560 may be included and configured to facilitate a user evoking and/or navigating through various views, options, and GUIs displayed by display 130. Input device 140 shown in FIG. 5 is merely illustrative of one of the many different types of user input devices that may be used to provide input commands to processing subsystem 110.

Returning to FIG. 4, device 400 may include a graphics engine 412 and an output driver 415. Graphics engine 412 may be configured to generate graphics to be provided to output driver 415, which may be configured to interface with or drive display 130. Output driver 415 may provide output signals to display 130, the output signals including graphical content (e.g., media content) generated by graphics engine 412 and to be presented by display 130 for experiencing by a user. For example, output driver 415 may provide data representative of a GUI including a program guide view to display 130 for presentation to the user. Graphics engine 412 and output driver 415 may include any combination of hardware, software, and/or firmware as may serve a particular application.

Storage device 420 may include one or more data storage media, devices, or configurations and may employ any type, form, and combination of storage media, including any of those mentioned herein. Media content, application data, application metadata, and other data may be temporarily and/or permanently stored in storage device 420.

Storage device 420 is shown to be a part of the device 400 in FIG. 4 for illustrative purposes only. It will be understood that storage device 420 may additionally or alternatively be located external of device 400. In certain embodiments, storage device 420 may be omitted from device 400.

Device 400 may include memory 425. Memory 425 may include, but is not limited to, FLASH memory, random access memory ("RAM"), dynamic RAM ("DRAM"), other suitable computer-readable media, or any combination or sub-combination thereof. In some examples, one or more modules and/or applications configured to run on device 400 may reside in memory 425.

Device 400 may include one or more tuners 435. Tuner 435 may be configured to selectively receive media content carried on a particular content carrier channel such that the media content may be processed by device 400. In some examples, device 400 may include multiple tuners 435 such that content carried on different content carrier channels may be concurrently received for processing by the device 400. For example, device 400 may include a first tuner configured to receive content carried on an analog video signal and a second tuner configured to concurrently receive content carried on a digital compressed signal.

While one or more tuners 435 may be used to receive various types of content-carrying signals transmitted by media content provider subsystem 120, additionally or alternatively, device 400 may be configured to receive other types of signals (e.g., other types of media content carrying signals) from media content provider subsystem 120 and/or one or more other sources without using a tuner 435. For example, media content provider subsystem 120 may transmit digital streams of data packets (e.g., Internet Protocol ("IP") based data packets) that can be received without using a tuner 435. For such types of signals, communication interface 405 may receive and forward the signals directly to other components of device 400 (e.g., processor 440 or signal processing unit 445) without the signals going through a tuner 435. For an IP-based signal, for example, signal processing unit 445 may function as an IP receiver.

Device 400 may include at least one processor, such as processor 440, configured to control and/or perform one or more operations of device 400. Device 400 may also include a signal processing unit 445 configured to process incoming media content and/or other signals. Signal processing unit 445 may be configured, for example, to demodulate and parse encoded digital media content. In some examples, device 400 may include one or more signal processing units 445 corresponding to each of the tuners 435.

Device 400 may include one or more modules, applications, and/or libraries (e.g., software modules and/or applications) residing in memory 425 or another computer-readable medium and configured to be executed by processor 440 of device 400. In FIG. 4, device 400 includes a resident service access module 450, an application launcher module 455, and resident SDK library 370 residing in memory 425. Resident service access module 450 (or simply "resident module 450") may be configured to perform or direct one or more other components of device 400 to perform one or more of the service access operations described herein. Application launcher module 455 may be configured to perform or direct one or more other components of device 400 to perform one or more of the application launcher operations described herein. In certain embodiments, resident facility 350 may be implemented in device 400 as resident module 450, and application launcher facility 360 may be implemented in device 400 as application launcher module 455.

Exemplary operations and configurations of application launcher module 455 as implemented on device 400 will now be described. The examples described are illustrative only and may also apply to and/or be used in other implementations of application launcher module 455, application launcher facility 360, and/or processing subsystem 110.

Figure 6:
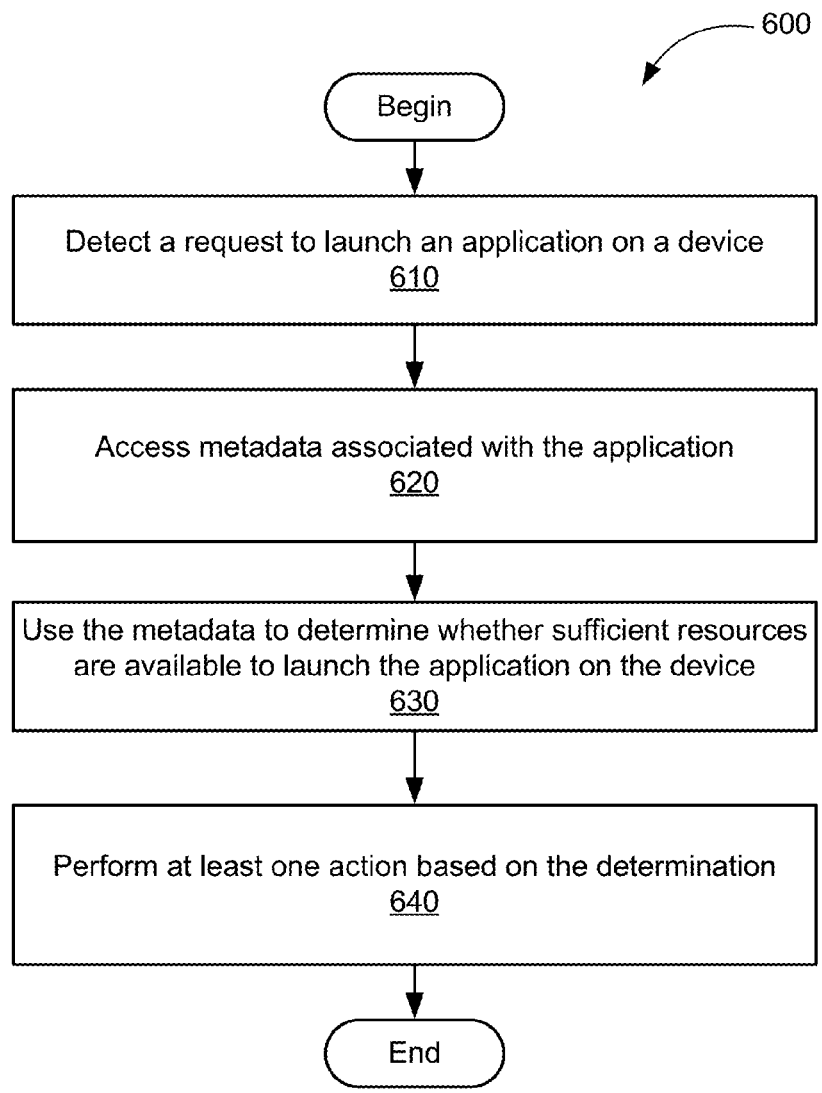
FIG. 6 illustrates an exemplary application launcher method.

Application launcher module 455 may be configured to perform and/or control one or more operations associated with launching one or more applications on device 400. As an example, FIG. 6 illustrates an exemplary application launcher method 600. While FIG. 6 illustrates exemplary steps according to one embodiment, other embodiments may omit, add to, reorder, and/or modify any of the steps shown in FIG. 6. In certain embodiments, one or more of the steps shown in FIG. 6 are performed by application launcher module 455 and/or device 400.

In step 610, a request to launch an application on device 400 is detected. The request may be initiated in any suitable way, including initiating the request external to application launcher module 455 or within application launcher module 455. As an example, a user of device 400 may provide input instructing device 400 to launch the application (e.g., via a user interface provided by resident module 450). As another example, an operation of resident module 450 running on device 400 may initiate a request for the application. As yet another example, an operation of another application running on device 400 may initiate a request for the application. Each of these requests may be forwarded to application launcher module 455.

In step 620, metadata associated with the application is accessed in response to the detected request. In certain examples, the metadata is accessed over a network, such as network 220. For instance, application launcher module 455 may access metadata maintained by media content provider subsystem 120 or other external source over network 220. In certain embodiments, application launcher module 455 may determine whether metadata associated with the application is stored locally on device 400 before accessing remotely stored metadata.

As used herein, "metadata" or "application metadata" may refer to any data descriptive of one or more applications. Such metadata associated with an application may include information descriptive of one or more resources that will or may be typically or possibly used and/or required to launch the application. For example, the metadata may specify device resources that will or may be used by the application running on device 400. Examples of such device resources may include memory, processor, tuner, network connection, graphics, input, output, hardware, firmware, middleware, software, and/or any other resources of device 400.

In step 630, the metadata associated with the application is used to determine whether sufficient resources are available to launch the application on device 400. The determination may be performed in any suitable way. In certain embodiments, for example, application launcher module 455 may compare resource requirement information in the metadata to actual current and/or planned usage of device resources. As described in more detail further below, application launcher module 455 may include a resource manager configured to track actual and/or planned usage of device resources. Application launcher module 455 may be configured to use the tracked resource usage data maintained by the resource manager together with the information in the application metadata to determine whether sufficient resources will be available to launch the application on device 400.

In step 640, at least one action is performed based on the determination made in step 630. As an example, when sufficient resources are determined not to be available for launching the application, the action may include blocking the requested launch of the application. Launch of the application may be blocked in any suitable way, including by blocking a download of the application (e.g., not sending a request to download the application). When sufficient resources are determined not to be available for launching the application, the action may additionally or alternatively include notifying a user of device 400 and/or another application running on device 400 (e.g., resident module 450) that sufficient resources are not available to launch of the application. The action may also include providing a user of device 400 with one or more options, which may include cancelling the request to launch the application and/or providing instruction to device 400 to release one or more device resources.

For instance, in step 630, application launcher module 455 may determine from the metadata that running a requested application may require use of tuner 435. Application launcher module 455 may further determine based on information provided by a resource manager that tuner 435 is unavailable. For example, tuner 435 may be busy recording a media content instance or may be scheduled to begin recording a media content instance. Notification may be provided to a user of device 400 and may specify that tuner 435 is not available for use by the requested application. The notification may also provide the user with an option to release tuner 435 for use by the application, such as by providing input configured to initiate cancellation of a conflicting current or scheduled media content recording. If tuner 435 is freed for use by the application, step 630 may be repeated to again determine whether sufficient resources are available to launch the application on device 400.

As another example of one or more actions that may be performed in step 640, when sufficient resources are determined to be available for launching the application, the action may include launching the application on device 400. Launching of the application may include allocating resources (e.g., memory resources), requesting and downloading data representative of the application, loading the application, and initiating execution of the application. Data representative of the application may be downloaded over network 220 from any suitable external source such as media content provider subsystem 120. In certain embodiments, application launcher module 455 may be configured to search for the application locally stored on device 400 before downloading the application from an external source. The downloaded application may be loaded into device memory (e.g., memory 425 of device 400) in preparation for execution. In certain embodiments, the downloaded application may be loaded directly into non-permanent memory for execution on device 400 (i.e., without being loaded into permanent memory on device 400). Non-permanent memory may include any volatile memory, such as any of the examples of volatile memory disclosed herein (e.g., dynamic random access memory ("DRAM")). Execution of the loaded application may then be initiated.

The application may be downloaded in a compiled and executable format such as one or more binary executable files and/or linked libraries. In certain embodiments, for example, the application may comprise an executable linkable file ("ELF"). In some examples, the compiled, executable application code is downloaded in a format that is native to device 400. Accordingly, device 400 may be able to execute the application without having to use a virtual machine or interpreter.

In certain examples, the application may be associated with resident module 450. For example, the application may be configured to be executed within an operational context of the resident module 450. For instance, the application may comprise a search application configured to perform searches for data (e.g., program guide data and/or media content) within a context of resident module 450. In such examples, application may be launched and executed within an operational context of the resident module 450.

In other examples, the application may not be associated with resident module 450. For instance, the application may be configured to run as a standalone application, such as a game. In such examples, application launcher module 455 may be configured to control a context switch from resident module 450 to the application. This may include passing control of device 400 from the resident module 450 running on device 400 to the application for execution of the application on device 400. Application launcher module 455 may also be configured to return control of device 400 from the application back to the resident module 450. This may be performed when the application terminated.

Figure 7:
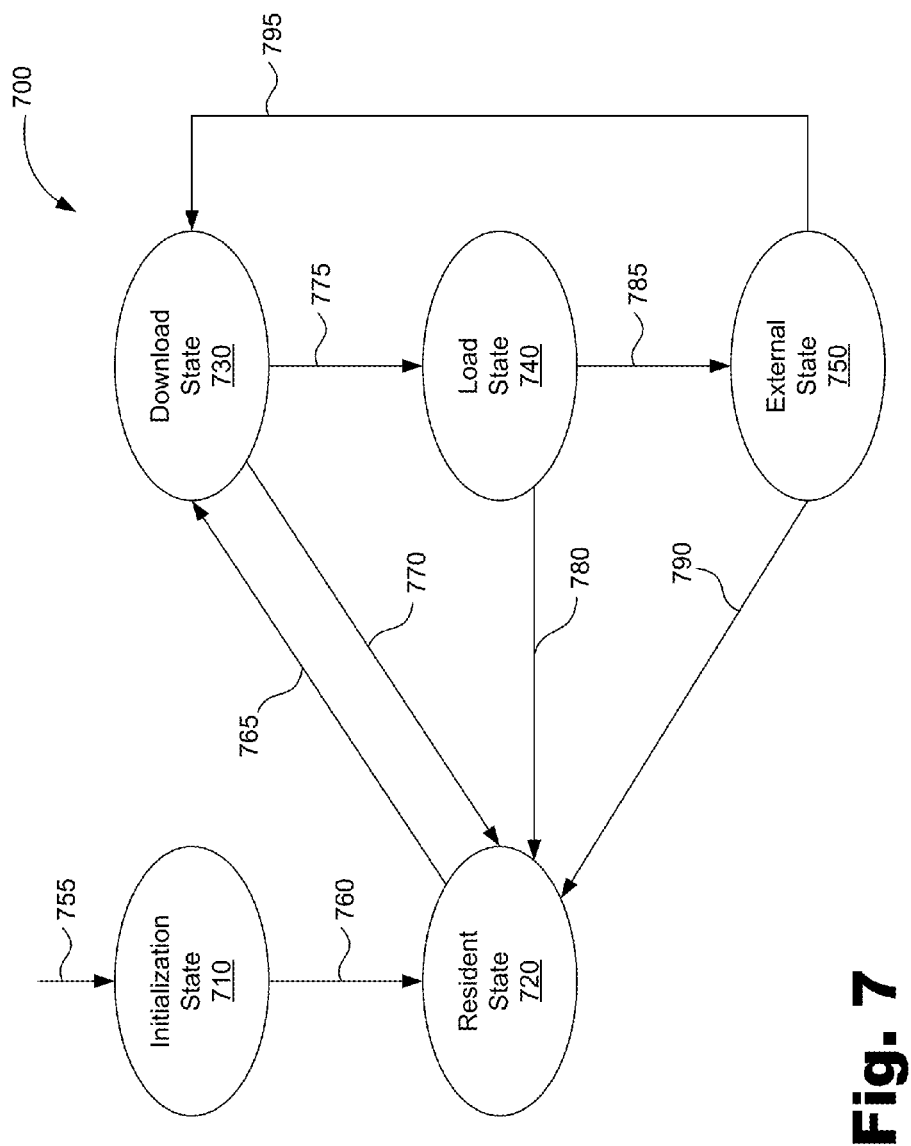
FIG. 7 illustrates an exemplary application launcher state machine model.

In certain embodiments, application launcher module 455 may be configured to follow a finite state machine model in which one or more operations are performed in response to a predefined event. As an example, FIG. 7 illustrates an exemplary finite state machine model 700 including an initialization state 710, resident state 720, download state 730, load state 740, and external state 750.

In finite state machine model 700, initialization state 710 is the first state in which application launcher module 455 may exist. In FIG. 7, arrow 755 represents a transition to initialization state 710, which transition may be performed in response to any predefined event. For example, when device 400 is powered on, a constructor may launch application launcher module 455, which will begin operations in the initialization state 710.

In initialization state 710, application launcher module 455 is initialized, which may include initialization of one or more components and data structures associated with application launcher module 455. After successful initialization, application launcher module 455 transitions to resident state 720. A transition from initialization state 710 to resident state 720 is represented by arrow 760 in FIG. 7.

In resident state 720, application launcher module 455 may spawn resident module 450 and pass control of device 400 to the resident module 450. Application launcher module 455 may be configured to wait in the resident state 720 until a predefined event is detected. The predefined event may include detection of a request to launch an application on device 400. The request may be initiated and detected in any of the ways described above. In response to the detected request, application launcher module 455 may access metadata associated with the application and use the metadata to determine whether sufficient resources are available to launch the application, as described above.

In certain embodiments, the metadata may be accessed and used to make a determination while application launcher module 455 is in the resident state 720. When sufficient resources are determined not to be available to launch the application, application launcher module 455 may remain in resident state 720 and perform one or more of the actions described above, including blocking the requested launch of the application. When sufficient resources are determined to be available to launch the application, application launcher module 455 may transition from resident state 720 to download state 730. A transition from resident state 720 to download state 730 is represented by arrow 765 in FIG. 7.

In certain other embodiments, application launcher module 455 may transition from resident state 720 to download sate 730 in response to detection of the request to launch the application, and the metadata may be accessed and used to make a determination regarding availability of sufficient resources while application launcher module 455 is in the download state 720. When sufficient resources are determined not to be available to launch the application, application launcher module 455 may transition back to resident state 720 and perform one or more of the actions described above, including blocking the requested launch of the application. A transition from download state 730 back to resident state 720 is represented by arrow 770 in FIG. 7.

In download state 730, application launcher module 455 may perform one or more operations related to downloading an application over network 220 from an external source such as media content provider subsystem 120. This may include providing information relevant to the download to media content provider subsystem 120. In certain embodiments, for example, application launcher module 455 may provide a based address of allocated memory to media content provider subsystem 120. Application launcher module 455 may transition from download state 730 back to resident state 720 in response to an interruption, cancellation, or error associated with the download, as represented by arrow 770 in FIG. 7. On the other hand, after the application is successfully downloaded in download state 730, application launcher module 455 transitions from download state 730 to load state 740. A transition from download state 730 to load state 740 is represented by arrow 775 in FIG. 7.

In load state 740, application launcher module 455 may perform one or more operations related to loading a downloaded application. Loading of the application may be performed in any of the ways described herein, including loading the application to memory 425 in preparation for execution on device 400. Application launcher module 455 may transition from load state 740 to resident state 720 in response to an interruption, cancellation, or error associated with loading the application. A transition from load state 740 to resident state 720 is represented by arrow 780 in FIG. 7. On the other hand, after the application is successfully loaded in load state 740, execution of the application may be initiated. In certain embodiments, application launcher module 455 initiates execution of the application on device 400. After the application is loaded and execution of the application is initiated, application launcher module 455 transitions from load state 740 to external state 750. A transition from load state 740 to external state 750 is represented by arrow 785 in FIG. 7.

In external state 750, application launcher module 455 may transfer control of device 400 to the application. During execution of the application, application launcher module 455 remains in external state 750. Application launcher module 455 may transition from external state 750 to resident state 720 upon termination of the execution of the application. A transition from external state 750 to resident state 720 is represented by arrow 790 in FIG. 7. A transition from external state 750 to resident state 720 may allow application launcher module 455 to regain control of device 400 and/or return control of device 400 to resident module 450. Application launcher module 455 may also be configured to transition from external state 750 to resident state 720 in response to an interruption, cancellation, or error associated with execution of the application. In certain embodiments, application launcher module 455 may be configured to proactively terminate execution of the application and transition from external state 750 to resident state 720 to regain control of device 400 and/or return control of device 400 to resident module 450.

When a request to launch another application is detected while application launcher module 455 is in external state 750, application launcher module 455 may transition from external state 750 to download state 730. A transition from external state 750 to download state 730 is represented by arrow 795 in FIG. 7. The first application may continue to run on device 400. Application launcher module 455 may follow the finite state machine model 700 as described above to access metadata associated with the second application, use the metadata to determine whether sufficient resources are available to launch the second application on device 400, and perform at least one action based on the determination. If sufficient resources are available and the second application is downloaded, loaded, and executed on device 400, the first and second application may be concurrently executed on device 400.

FIG. 8 illustrates exemplary components of application launcher module 455. As shown in FIG. 8, application launcher module 455 may include a core engine 810, external interface module 820, and resource manager 830 communicatively coupled to one another as shown. Core engine 810, external interface module 820, and resource manager 830 may communicate with one another using any suitable data communication technologies.

Core engine 810 may include a state machine 835, main task 840, and message queue 845. Main task 840 may be spawned by a device constructor during boot up of device 400. State machine 835 may be defined in accordance with finite state machine model 700. Hence, each operation of core engine 810 may be performed in response to a predefined event, including any of the events described above in relation to finite state machine module 700.

Message queue 845 may be maintained by core engine 810. Events, including events generated internally to or externally of application launcher module 455 may be received in message queue 845. Core engine 810 may perform one or more operations in response to events in the message queue 845.

Core engine 810 may also be configured to maintain an application stack, which may store information related to each application running on device 400. For example, each application running on device 400 may be identified with an application identifier in the stack. The stack may facilitate concurrent execution of multiple applications on device 400.

External interface module 820 may be configured to support interaction with one or more applications such as resident module 450 and/or another application (e.g., a downloaded application) associated with device 400. External interface module 820 may include a metadata navigation module 850, application interface APIs 855, and application controller APIs 860. Metadata navigation module 850 may be configured to collect and/or maintain basic information for identifying applications that may be available for download and/or execution by device 400, such as applications stored in media content provider subsystem 120. Such basic information may be referred to as "application navigation metadata" or "navigation metadata" and may include any basic information potentially useful for identifying one or more applications. For example, application navigation metadata may include application identifiers (e.g., application names) and/or application version identifiers.

Thus, metadata navigation module 850 may be queried for information about applications that are available for downloading and/or execution by device 400. As an example, resident module 450 may query metadata navigation module 850 for a list of available applications and/or to determine whether a particular application is available.

Metadata navigation module 850 may be further configured to request and initiate downloading of application metadata associated with an application. The downloaded application metadata may be used by core engine 810 and/or resource manager 830 to determine whether sufficient resources are available to launch the application on device 400, as described above.

Application interface APIs 855 may include a set of well-defined application program interfaces ("APIs") that may be used by applications on device 400 (e.g., resident module 450 and/or one or more other applications running on device 400) to communicate with application launcher module 455. Examples of such APIs may include, but are not limited to, APIs that allow applications to post events to the core engine message queue 845, register heartbeat callbacks with core engine 810, request metadata associated with an application, request launch of an application, request download of an application, request a forced termination of an application, register event callbacks with core engine 810, get the current status of application launcher module 455, and get the current state of application launcher module 455.

Application controller APIs 860 may include a set of defined APIs that may be used by core engine 810 to control applications on device 400 (e.g., resident module 450 and/or one or more other applications running on device 400). Examples of such APIs may include, but are not limited to, APIs to check the status of applications running on device 400 (e.g., an API to regularly send heartbeats to an application), transfer control of device 400 to an application, regain control of device 400 from an application, forcefully terminate applications running on device 400, start execution of resident module 450, suspend execution of resident module 450, and resume execution of resident module 450.

Resource manager 830 may be configured to interact with resident SDK library 370 to provide access to device resources, including hardware, middleware, firmware, and/or software resources of device 400. Resource manager 830 may be further configured to track usage of device resources and to make determinations as to whether sufficient resources are available for launch of an application. As shown in FIG. 8, resource manager 830 may include a validation module 865, downloader module 870, loader module 875, and resource controller 880.

Validation module 865 may be configured to determine whether sufficient resources are available for an application to be launched on device 400. This determination may be referred to as a "validation" or "resource validation." As described above, if sufficient resources are not available for an application, the launch of the application may be blocked. In certain embodiments, validation module 865 may attempt to facilitate a release of one or more resources to try to free sufficient resources for the application. For example, validation module 865 may attempt to release one or more resources allocated for resident module 450 in order to accommodate the application. If a release operation is successful and sufficient resources are freed, core engine 810 may initiate a download of the application.

Downloader module 870 may be configured to download an application from an external source such as media content provider subsystem 120. Downloader module 870 may access functionality and/or resources of communication interface 405 and/or device 400 (e.g., through resident SDK library 370) to request and download data representative of the application from media content provider subsystem 120.

Loader module 875 may be configured to load and initiate execution of a downloaded application. In certain embodiments, loader module 875 may include a vector table 885 as shown in FIG. 8. Vector table 885 may be linked to resident SDK library 370. For example, vector table 885 may contain pointers to APIs exposed by resources of device 400 (e.g., APIs exposed by resident SDK library 370). When device firmware loads and enables the resident module 450 and application launcher module 455, addresses associated with functions of resident module 450, application launcher module 455, and/or device resources may be resolved and included in vector table 885. Resolved vector table 885 may be used by application launcher module 455 to override another vector table associated with another application (e.g., a downloaded application), as described further below.

Resource controller 880 may be configured to acquire (e.g., reserve and/or allocate) and release (i.e., free) device resources being used by and/or reserved for use by an application. Resource controller 880 may also be configured to track device resources being used by and/or reserved for use by an application. The tracked information may be accessible to validation module 865 for use in performing a resource validation as described above. In addition, resource controller 880 may be configured to work together with validation module 865 to attempt to release resources from resident module 450 or one or more other applications when sufficient resources are not available for an application. Acquiring, releasing, and tracking usage of device resources may be performed in any suitable manner.

In certain embodiments, resource manager 830 may be configured to track usage of device resources by maintaining a data structure (e.g., a buffer, table, or database) in which information descriptive of device resources and usage of the resources is stored. Resource manager 830 may be configured to store an application identifier in the data structure. The application identifier may indicate an application for which a device resource is reserved. Accordingly, resource manager 830 may be able to determine all device resources reserved for a particular application. Resource manager 830 may be further configured to maintain a pointer (e.g., a handle) to reserved resources in the data structure. Resource manager 830 may use an application identifier and associated pointers in the data structure to forcefully release resources. A forceful release of resources may be performed when an application terminates or experiences an error condition (e.g., the application crashes).

With the resource usage information stored in the data structure, resource manager 830 may be configured to clean up resources after an application terminates. For example, application launcher module 455 may receive a notification of an application termination. Resource manager 830 may use the application identifier for the application to identify in a data structure all resources allocated for the application. The resources allocated to the application may be released from the application, and the entries in the data structure deleted so that the resources are available for use by other applications. In this manner, when an application running on device 400 is forced to terminate, resource manager 830 may recover and clean up resources that were being used by and/or reserved for use by the application.

Figure 9A:
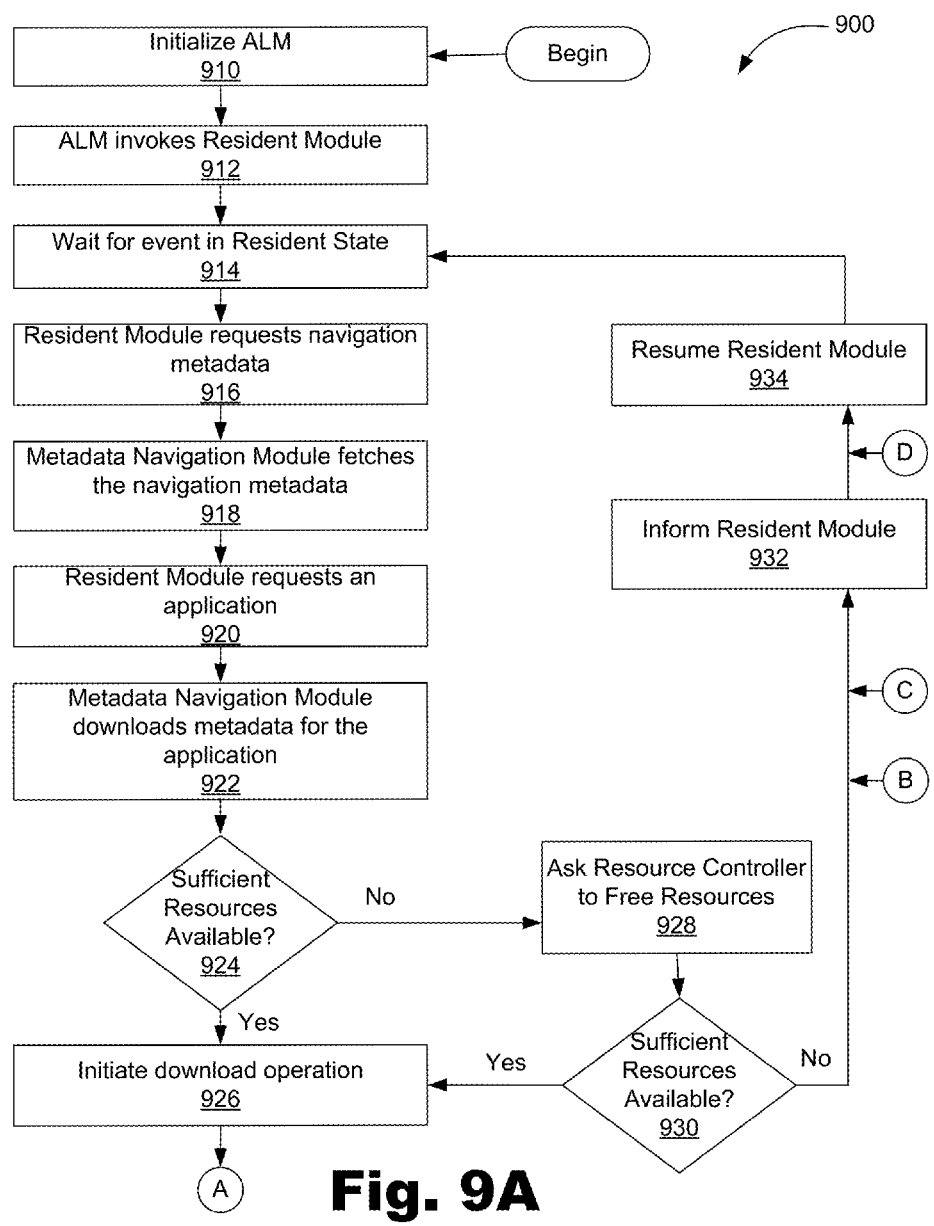
FIGS. 9A-9B illustrate another exemplary application launcher method.
Figure 9B:
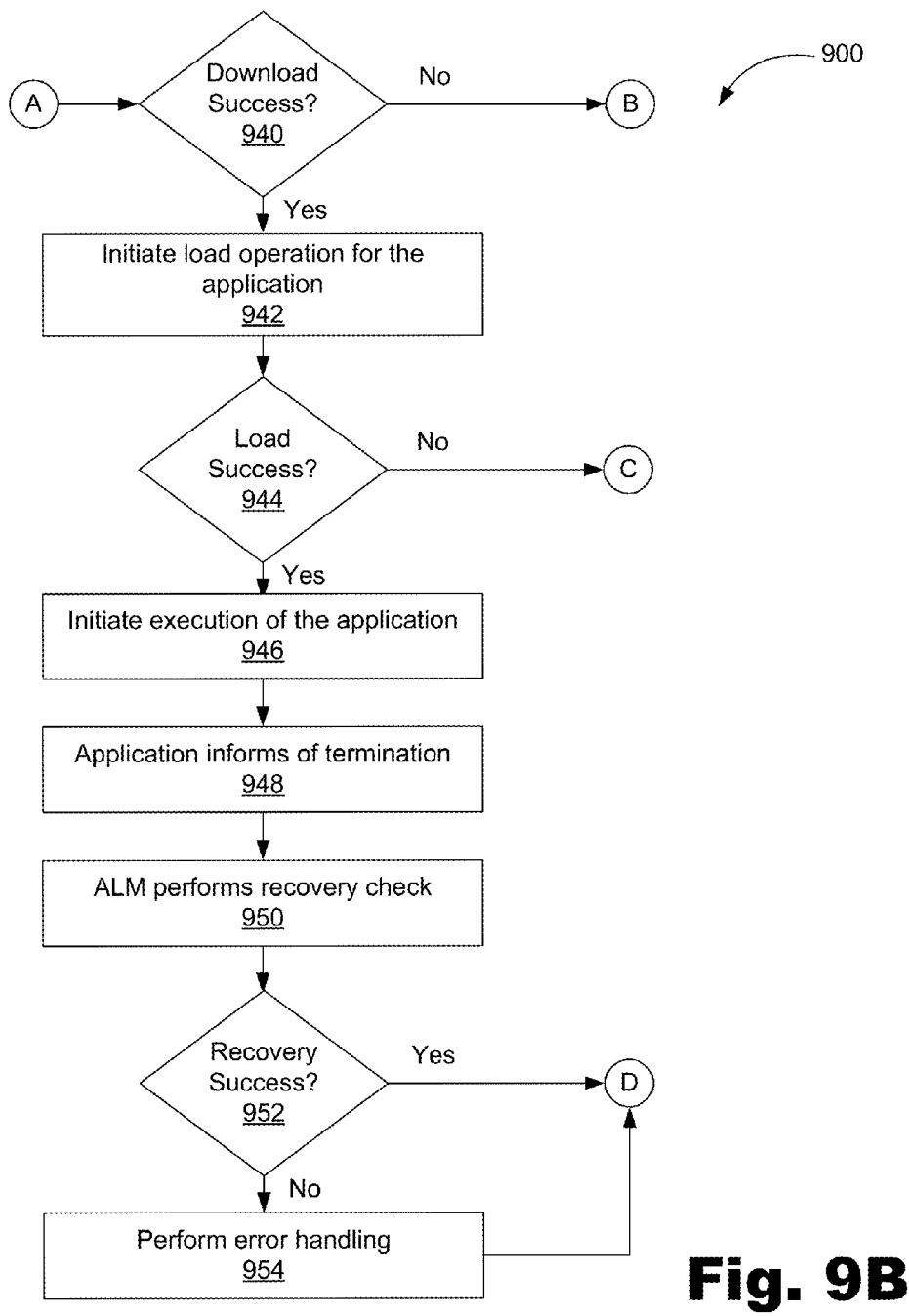

An exemplary use case scenario for application launcher module 455 will now be described. FIGS. 9A-9B illustrate an application launcher method 900 for the exemplary use case scenario. In step 910, application launcher module ("ALM") 455 is initialized. In step 912, application launcher module 455 invokes resident module 450 and relinquishes control of device 400 to the resident module 450. In step 914, application launcher module 455 waits for an event while in resident state 720. In step 916, resident module requests navigation metadata. In step 918, metadata navigation module 850 fetches the navigation metadata. The navigation metadata may be provided to resident module 450, which may use the data to identify one or more applications that may be available for download. Additionally or alternatively, resident module 450 may direct device 400 to present the data on display 130 such that a user of device 400 may view and select from available applications.

In step 920, resident module 450 requests an application. Application launcher module 455 may detect this request to launch the application. As an example, the application may include a search executable that may be configured to be run in a context of the resident module 450. In step 922, metadata navigation module 850 may initiate a download of metadata for the requested application. The application metadata may be downloaded from any suitable external source, such as media content provider subsystem 120.

In step 924, validation module 865 may determine, based on the downloaded metadata, whether sufficient resources are available for the application. If sufficient resources are determined to be available, a download of the application may be initiated in step 926. If sufficient resources are determined not to be available, validation module 865 may ask resource controller 880 to free resources in step 928. Resource controller 880 may attempt to release resources, including one or more resources reserved for use by resident module 450. This may include automatically releasing resources not being used and/or prompting a user to cancel one or more operations of resident module 450. In step 930, validation module 865 may again determine, based on the downloaded metadata, whether sufficient resources are available for the application. If sufficient resources are determined to be available, a download of the application may be initiated in step 926. If sufficient resources are determined not to be available, application launcher module 455 may inform resident module 450 that sufficient resources are not available for the application in step 932. In step 934, operations of resident module 450 may be resumed, and application launcher module 455 may return to step 914 to wait for another event while is resident state 720.

After a download of the application is initiated in step 926, processing may move to step 940, which transition is represented by "A" in FIGS. 9A-9B. In step 940, application launcher module 455 may determine whether the download was successful. If the download was not successful, processing may move from step 940 to step 932, which transition is represented by "B" in FIGS. 9A-9B. If the download was successful, a loading of the application may be initiated in step 942. In step 944, application launcher module 455 may determine whether the loading was successful. If the loading was not successful, processing may move from step 944 to step 932, which transition is represented by "C" in FIGS. 9A-9B. If the download was successful, execution of the application may be initiated in step 946. The application may then be run on device 400 while application launcher module 455 is in external state 750.

In step 948, the application informs application launcher module 455 of termination of the application. In step 950, application launcher module 455 performs a recovery check. This may include checking with resource controller 880 to determine whether resources allocated to the application have been successfully released. In step, 952, application launcher module 455 determines whether the recovery was successful. If the recovery was not successful, application launcher module 455 may perform error handling in step 954 before transitioning to step 934. This transition is represented by "D" in FIGS. 9A-9B. If the recovery was successful, application launcher module 455 may transition from step 952 directly to step 934, as represented by "D" in FIGS. 9A-9B.

Media content provider subsystem 120 may be configured to interact with processing subsystem 110 (e.g., application launcher module 455 implemented on device 400). For example, media content provider subsystem 120 may be configured to receive, compile, and/or store data representative of one or more applications that may be available to processing subsystem 110 for download. Media content provider subsystem 120 may also be configured to maintain metadata for the applications and to make the metadata available to processing subsystem 110 for download.

Figure 10:
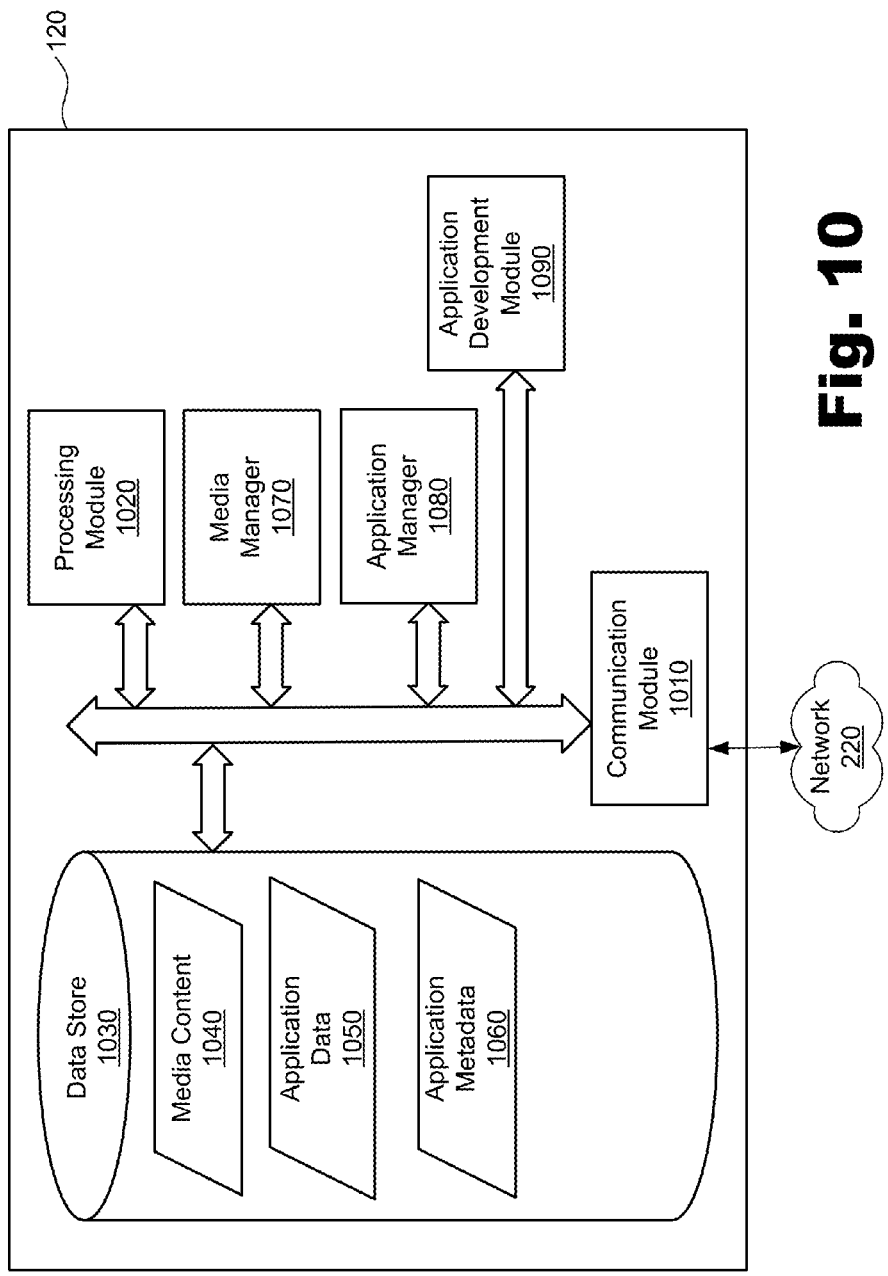
FIG. 10 illustrates an exemplary media content provider subsystem.

FIG. 10 illustrates exemplary components of media content provider subsystem 120 (or simply "provider subsystem 120"). The components of provider subsystem 120 may include or be implemented as hardware, computing instructions (e.g., software) embodied on a computer-readable medium, or a combination thereof. In certain embodiments, for example, one or more components of provider subsystem 120 may include or be implemented on one or more servers, such as server 210, configured to communicate over network 220. While an exemplary provider subsystem 120 is shown in FIG. 10, the exemplary components illustrated in FIG. 10 are not intended to be limiting. Indeed, additional or alternative components and/or implementations may be used in other embodiments.

As shown in FIG. 10, provider subsystem 120 may include a communication module 1010, which may be configured to communicate with processing subsystem 110 over network 220, including transmitting and receiving data to/from processing subsystem 110. In particular, communication module 1010 may support transmission of media content, application data, and application metadata to processing subsystem 110. The communication module 1010 may include and/or support any suitable communication platforms and technologies for communicating with and transporting data to/from processing subsystem 110. Communication module 1010 may be configured to support a variety of communication platforms, protocols, and formats.

Provider subsystem 120 may include a processing module 1020 configured to control operations of components of the provider subsystem 120. Processing module 1020 may execute or direct execution of operations in accordance with computer-executable instructions stored to a computer-readable medium such as a data store 1030. As an example, processing module 1020 may be configured to process (e.g., encode, decode, modulate, and/or demodulate) data and/or communications received from or to be transmitted to processing subsystem 110. As another example, processing module 1020 may be configured to perform data management operations on data stored in data store 1030. For example, processing module 1020 may operate on data, including storing data to data store 1030 and indexing, searching, accessing, retrieving, modifying, annotating, backing up, encrypting, encoding, decrypting, decoding, copying, and/or deleting data stored in data store 1030. In some examples, processing module 1020 may be configured to perform device-specific data formatting before data is provided to (e.g., downloaded to) processing subsystem 110.

Data store 1030 may include one or more data storage media, devices, or configurations and may employ any type, form, and combination of storage media. For example, the data store 1030 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data store 1030 may store any suitable type or form of electronic data, including media content 1040, application data 1050, and application metadata 1060, for example.

Media content 1040 may include any electronically stored data representative of media content. Examples of such media content may include, but is not limited to, any television program, on demand media program, pay-per-view media program, broadcast, narrowcast, or multicast media program, IPTV content, commercial, advertisement, video, movie, song, image, photograph, sound, or any segment, component, or combination of these or other forms of media content that may be viewed or otherwise experienced by a user.

Application data 1050 may include any electronically stored data representative of one or more applications. In certain embodiments, application data 1050 may include data representative of compiled applications such as binary executable libraries (e.g., executable linked libraries). Accordingly, an application may be downloaded, loaded, and executed by processing subsystem 110 without processing subsystem 110 having to locally compile the application. In certain embodiments, the applications may be in a format that is native to processing subsystem 110. Accordingly, an application may be downloaded, loaded, and executed by processing subsystem 110 without processing subsystem 110 having to use an interpreter or virtual machine.

Application metadata 1060 may include any electronically stored data that is descriptive of one or more applications represented in the application data 360. Application metadata 1060 may include any information descriptive of an application, including resource requirements for the application and/or any of the application information disclosed above.

Provider subsystem 120 may further include a media manager 1070, which may be configured to control operations related to media content 1040. Such operations may include maintaining media content 1040 in data store 1030 and processing media content 1040 for transmission to processing subsystem 110 over network 220.

Provider subsystem 120 may further include an application manager 1080, which may be configured to control operations related to application data 1050 and application metadata 1060. For example, application manager 1080 may be configured to receive, compile, and/or store data representative of one or more applications as application data 1050 that may be available to processing subsystem 110 for download. Application manager 1080 may also be configured to maintain metadata for the applications and to make the metadata available to processing subsystem 110 for download. In certain embodiments, application manager 1080 includes a server-side component of application launcher module 455 implemented in device 400.

In certain embodiments, provider subsystem 120 may include an application development module 1090, which is described in detail further below.

Figure 11:
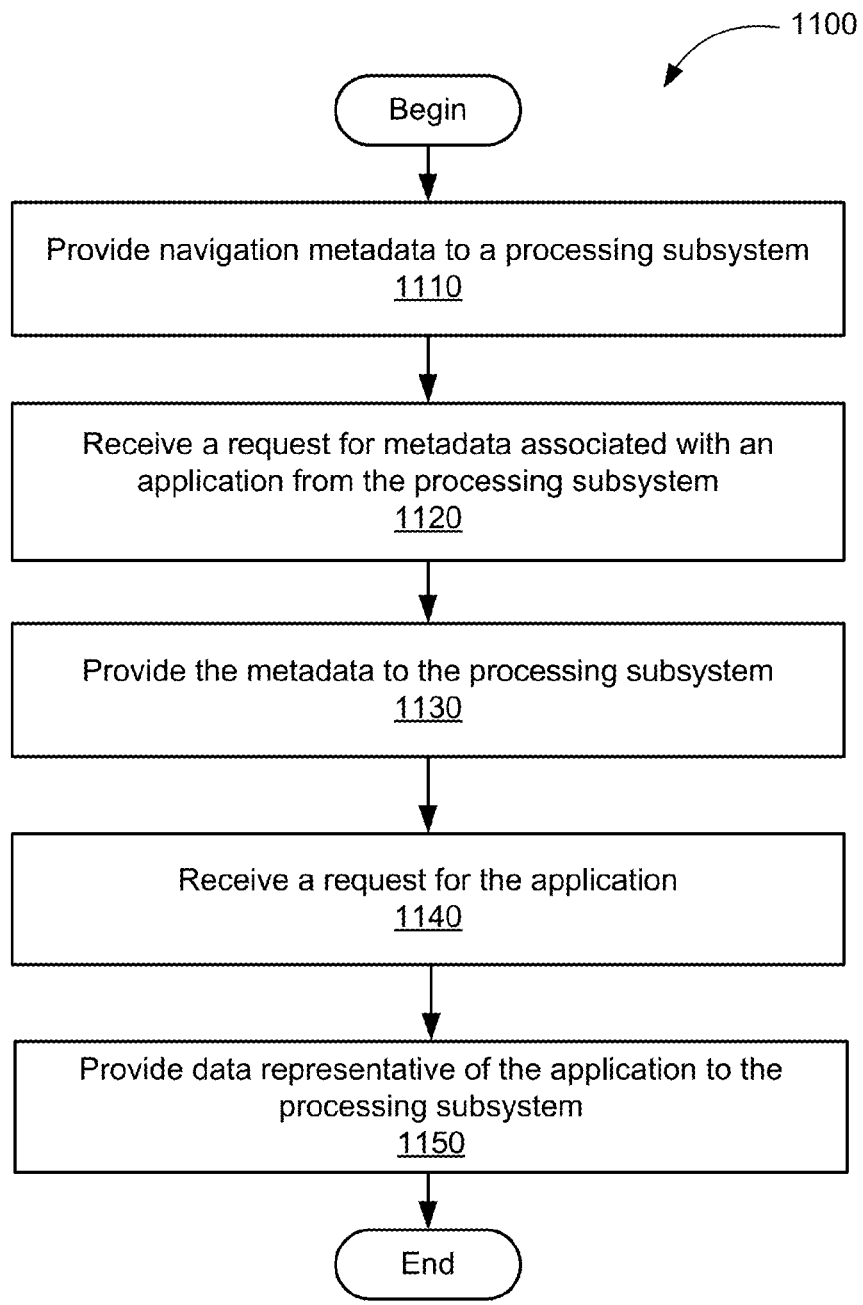
FIG. 11 illustrates another exemplary application launcher method.

Returning now to application manager 1080, FIG. 11 illustrates an exemplary application launcher method 1100. While FIG. 11 illustrates exemplary steps according to one embodiment, other embodiments may omit, add to, reorder, and/or modify any of the steps shown in FIG. 11. In certain embodiments, one or more of the steps shown in FIG. 11 are performed by application manager 1080 and/or provider subsystem 120.

In step 1110, navigation metadata is provided to a processing subsystem 110. In certain embodiments, this may include providing navigation metadata to device 400. Step 1110 may be initiated periodically by application manager 1080 or in response to a predetermined event, such as receipt of a request for the navigation metadata from processing subsystem 110 or a change to application data 1050 or application metadata 1060 in data store 1030 (e.g., an application is added or deleted). As described above, navigation metadata may include basic information for identifying an application and/or metadata for the application.

In step 1120, a request for metadata associated with an application is received from processing subsystem 110. In step 1130, the requested application metadata 1060 is provided to the processing subsystem 110 such as by transmission to processing subsystem 110 over network 220.

In step 1140, a request for the application is received. In step 1150, data representative of the requested application is provided to processing subsystem 110 such as by transmission to processing subsystem 110 over network 220.

Figure 12:
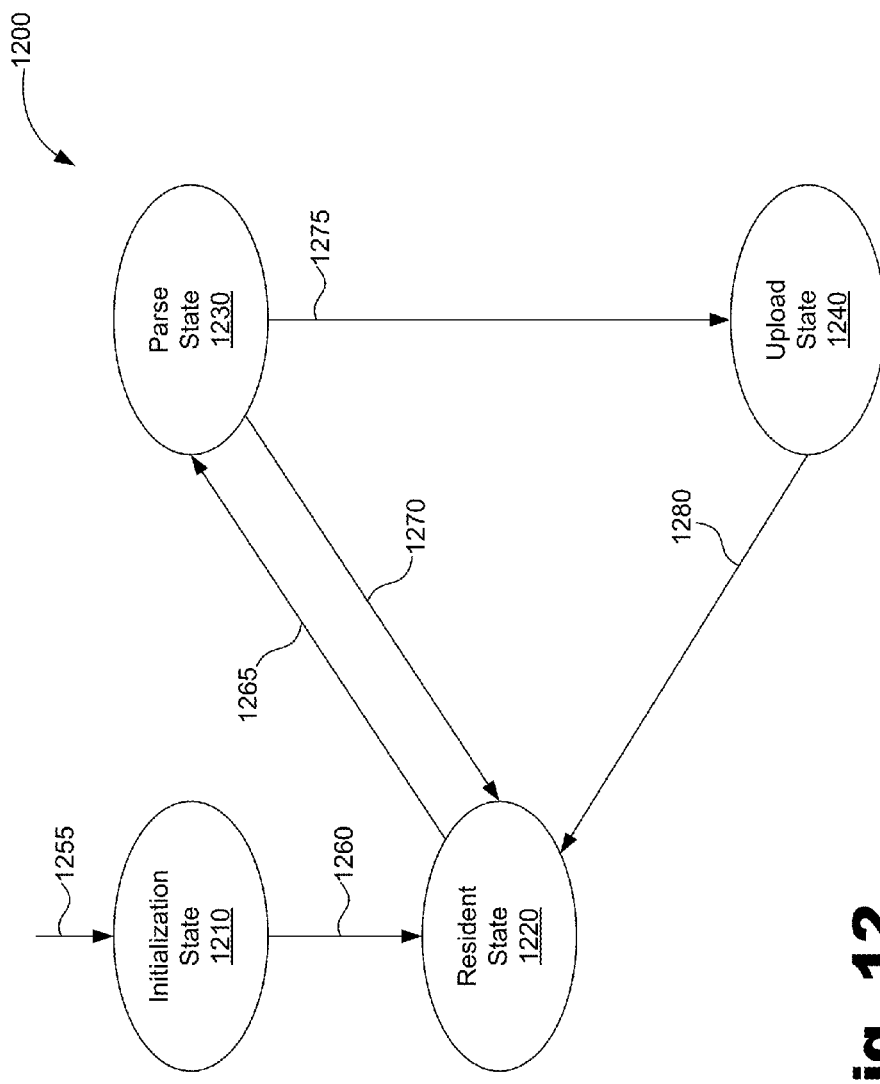
FIG. 12 illustrates another exemplary application launcher state machine model.

In certain embodiments, application manager 1080 may be configured to follow a finite state machine model in which one or more operations are performed in response to a predefined event. As an example, FIG. 12 illustrates an exemplary finite state machine model 1200 including an initialization state 1210, resident state 1220, parse state 1230, and upload state 1240.

In finite state machine model 1200, initialization state 1210 is the first state in which application manager 1080 may exist. In FIG. 12, arrow 1255 represents a transition to initialization state 1210, which transition may be performed in response to any predefined event. For example, when a routine running on provider subsystem 120 launches application manager 1080, execution of the application manager 1080 will begin in initialization state 1210.

In initialization state 1210, application manager 1080 is initialized, which may include initialization of one or more components and data structures associated with application manager 1080. After successful initialization, application manager 1080 transitions to resident state 1220. A transition from initialization state 1210 to resident state 1220 is represented by arrow 1260 in FIG. 12.

In resident state 1220, application manager 1080 may wait for a predefined event. The predefined event may include receipt of a relevant request from processing subsystem 110, such as a request for download of application metadata 1060 or application data 1050. Application manager 1080 may be configured to listen on a communication socket for receipt of a relevant request from application launcher facility 360 and/or application launcher module 455. In response to a relevant request, application manager 1080 may transition from resident state 1220 to parse state 1230. A transition from resident state 1220 to parse state 1230 is represented by arrow 1265 in FIG. 12.

In parse state 1230, application manager 1080 may perform one or more operations related to responding to the request. Such operations may include retrieving application metadata 1060 and/or application data 1050 from data store 1255, parsing, performing memory relocation, and initiating transmission of such data to processing subsystem 110 over network 220. In certain embodiments, for example, as part of a request application manager 1080 may receive a base address of memory allocated by processing subsystem 110 for the requested data. Application manager 1080 may be configured to relocate data representative of a requested application to the base address. The relocation may be performed in any suitable manner. In certain embodiments, after relocation of application data, application manager 1080 may parse the application data. The parsing may include application manager 1080 identifying an application entry point and base address for a function pointers array associated with the application. Parsing may also include providing segments of the data representative of the application to one or more buffers in preparation for transmission to processing subsystem 110.

Application manager 1080 may transition from parse state 1230 back to resident state 1220 in response to an interruption, cancellation, or error associated with responding to the request. A transition from parse state 1230 back to resident state 1220 is represented by arrow 1270 in FIG. 12. On the other hand, after application manager 1080 successfully responds to the request, application manager 1080 transitions from parse state 1230 to upload state 1240. A transition from parse state 1230 to upload state 1240 is represented by arrow 1275 in FIG. 12.

In upload state 1240, application manager 1080 may perform one or more operations related to uploading or otherwise providing data (e.g., application metadata 1060 or application data 1050) from provider subsystem 120 to processing subsystem 110. In certain embodiments, providing of data representative of an application to processing subsystem 110 may include transmitting segments of the application data, an application entry point, and a base address of a function pointer array associated with an application to processing device 110 over network 220. Application manager 1080 may transition from upload state 1240 to resident state 1220 in response to an interruption, cancellation, or error associated with uploading data to processing subsystem 110, or upon successful completion of uploading operations. A transition from upload state 1240 to resident state 1220 is represented by arrow 1280 in FIG. 12.

Figure 13:
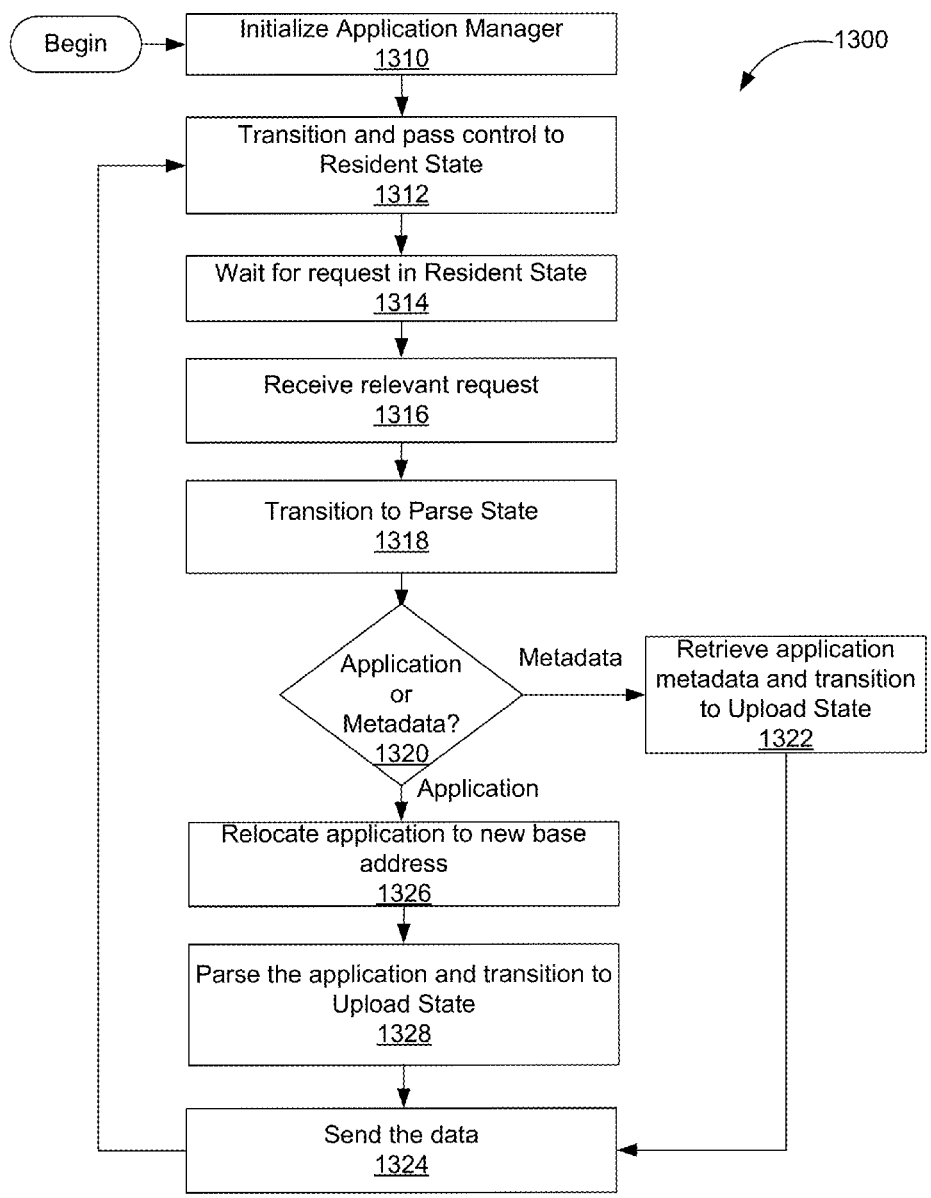
FIG. 13 illustrates another exemplary application launcher method.

An exemplary use case scenario for application manager 1080 will now be described. FIG. 13 illustrates an application launcher method 1300 for the exemplary use case scenario. While FIG. 13 illustrates exemplary steps according to one embodiment, other embodiments may omit, add to, reorder, and/or modify any of the steps shown in FIG. 13. In certain embodiments, one or more of the steps shown in FIG. 13 are performed by application manager 1080.

In step 1310, application manager 1080 is initialized. In step 1312, application manager 1080 transitions and passes control to resident state 1220. In step 1314, application manager 1080 waits for a relevant request while in resident state 1220. As mentioned, this may include listening on a socket for a request from application launcher facility 360 and/or application launcher module 455. In step 1316, a relevant request is received. In step 1318, application manager 1080 transitions to parse state 1230.

In step 1320, application manager 1080 determines whether the request is for an application or for metadata associated with an application. When the request is for application metadata, application manager 1080 may retrieve the requested application metadata from data store 1030 and transition to upload state 1240 in step 1322. In step 1324, the application metadata is sent to requesting processing subsystem 110. After step 1324, application manager 1080 may transition and pass control to resident state 1220 in step 1312.

Returning to step 1320, when the request is for an application, application manager 1080 may retrieve appropriate application data and relocate the application data to a new base address in step 1326. As mentioned, the request for the application may include a base address for a segment of memory that has been allocated by processing subsystem 110 for the application. Application manager 1080 may use this base address to relocate the application data. In step 1328, application manager 1080 parses the application data and transitions to the upload state 1240. The parsing may be performed as described above and may include application manager 1080 identifying an application entry point and base address for a function pointers array associated with the application and providing segments of the data representative of the application to one or more buffers in preparation for transmission to processing subsystem 110. In step 1324, the application data is sent to requesting processing subsystem 110. After step 1324, application manager 1080 may transition and pass control to resident state 1220 in step 1312.

As mentioned above, provider subsystem 120 may include application development module 1090, which may be configured to support development of applications that may be provided to and executed by processing subsystem 110. Application development module 1090 may include a server-side component of the resident SDK library 370 that resides in processing subsystem 110. Such a server-side component of the resident SDK library 370 may be referred to as a "development library" and may include "dummy" implementations of actual SDK library calls and APIs defined by resident SDK library 370 and used to access resources of processing subsystem 110.

The development library may be made accessible to application developers, including third-party developers. For example, a developer may be granted access to the development library stored in provider subsystem 120. Accordingly, developers may create applications to be executed by processing subsystem 110 by being built on top of the development library. The development library may be compiled along with a developed application by application development module 1090. Accordingly, the development library is linked to the compiled application.

In certain embodiments, the development library may include a vector table configured to point to APIs defined in the development library. For example, a vector table may include a one-dimensional array of pointers to the development library APIs. The development library may include a global pointer to the vector table. The development library vector table may be linked to the development library such that a function call initiated by an application executing on device 400 may be routed to the development library and specifically to an appropriate position in the development library vector table.

When a compiled application is downloaded and loaded into memory by device 400 as described herein, the vector table included in development library that was compiled along with the application may be overridden by application launcher module 455 with a resident vector table 885 that contains actual addresses of SDK APIs available on the device 400. Accordingly, when an application executing on device 400 calls an SDK API, the call may be routed from the development library associated with the application to the resident SDK library.

Figure 14:
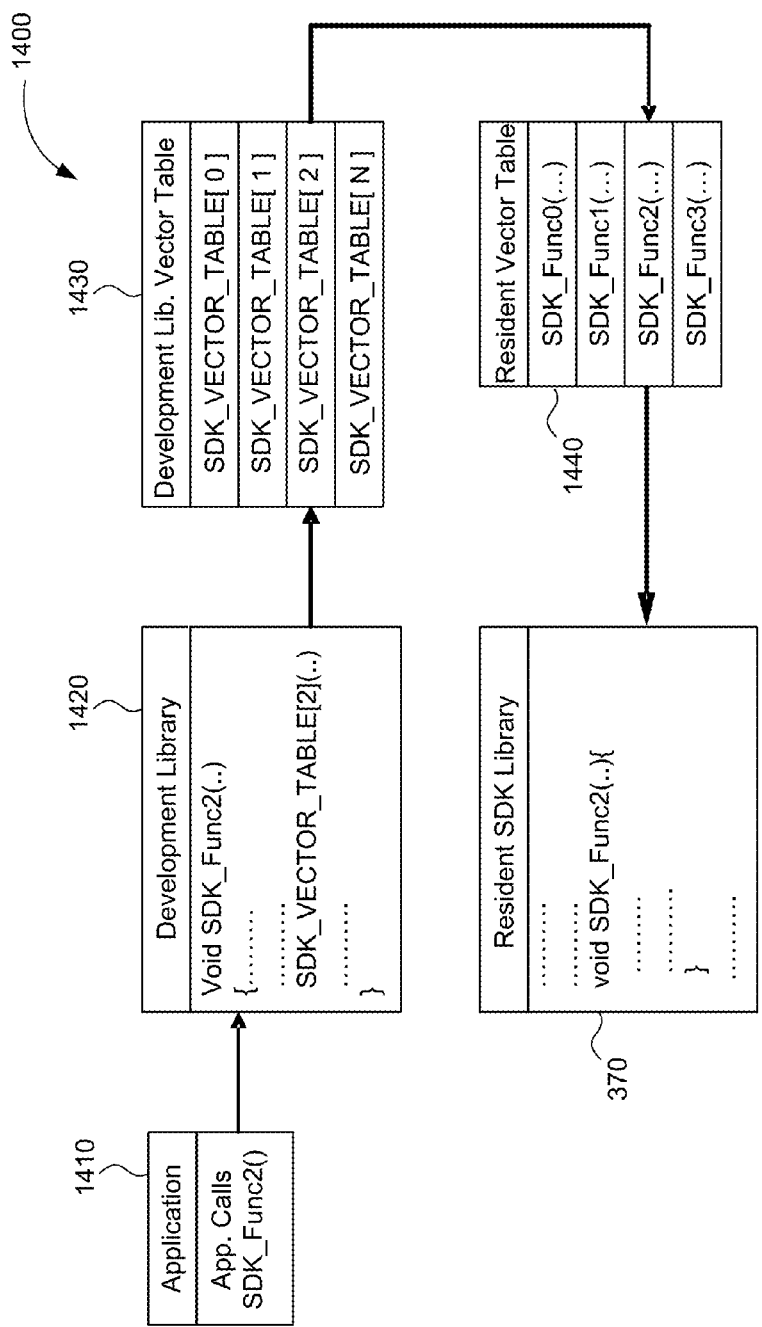
FIG. 14 illustrates an exemplary control flow of a call made from an application executing on a device.

FIG. 14 illustrates an exemplary control flow 1400 of an SDK API call made from an application executing on device 400. As shown in FIG. 14, an application 1410 calls a function identified as "SDK_Func2()." The function is accessed in development library 1420. As shown, the function in the development library 1420 may include a pointer to a position in development library vector table 1430. Because the development library vector table 1430 was overridden by a resident vector table 1440 when application 1410 was loaded in memory of device 400, the function call to the development library vector table 1430 may be routed from the development library vector table 1430 to a corresponding position in the resident vector table 1440. As shown, the resident vector table 1440 includes a pointer to resident SDK library 370 including the called function. The called function may be invoked using the resident SDK library 370, which may thereby provide application 1410 with access to one or more resources of device 400.

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A method comprising:
    detecting a request to launch an application on a device;
    accessing metadata associated with said application over a network, said metadata associated with said application being different from application data configured to launch said application;
    determining, based on said metadata, whether available memory and processor resources for said device are sufficient to launch said application on said device; and
    performing at least one action based on said determination.

2. The method of claim 1, wherein when available memory and processor resources for said device are sufficient to launch said application on said device, said at least one action comprises launching said application for execution on said device.

3. The method of claim 2, wherein said launching comprises:
    downloading said application data over said network;
    loading said application data; and
    initiating execution of said application on said device.

4. The method of claim 1, wherein when available memory and processor resources for said device are not sufficient to launch said application on said device, said at least one action comprises blocking said requested launch of said application.

5. The method of claim 4, wherein said blocking said requested launch of said application comprises blocking a request to download said application data to said device over said network.

6. The method of claim 1, wherein when said available memory and processor resources are determined not to be sufficient to launch said application on said device, said at least one action comprises attempting to release at least one of said memory and processor resources on said device.

7. The method of claim 6, wherein said at least one action further comprises:
    releasing said at least one of said memory and processor resources on said device; and
    determining again, based on said metadata, whether available memory and processing resources are sufficient to launch said application on said device.

8. The method of claim 1, wherein said application is one of a search tool, an interactive game, a user interface, a widget, a standalone software program, and a software program for use in an operation of a resident service access facility.

9. The method of claim 1, tangibly embodied as computer-executable instructions on at least one non-transitory computer-readable medium.

10. An apparatus comprising:
    at least one processor;
    a computer-readable medium communicatively coupled to said at least one processor; and
    an application launcher module tangibly embodied on said computer-readable medium, said application launcher module configured to direct said at least one processor to:
        detect a request to launch an application,
        access metadata for said application over said network, said metadata for said application being different from application data configured to launch said application,
        determine, based on said metadata, whether available memory and processor resources are sufficient to launch said application with said application launcher module, and
        perform at least one action based on said determination.

11. The apparatus of claim 10, wherein when available memory and processor resources for said device are sufficient to launch said application on said device, said application launcher module directs said processor to launch said application for execution on said device.

12. The apparatus of claim 11, wherein said application launcher module directs said processor to launch said application for execution on said device by:
    directing said processor to download said application data over said network;
    directing said processor to load said application data; and
    directing the processor to initiate execution of said application on said device.

13. The apparatus of claim 10, wherein when available memory and processor resources for said device are not sufficient to launch said application on said device, said application launcher module directs said processor to block said requested launch of said application.

14. A system comprising:
    a media content provider subsystem configured to maintain application data representative of an application and application metadata descriptive of said application;
    an application launcher facility within a media content processing subsystem, said application launcher facility configured to:
        detect a request to launch said application on said media content processing subsystem,
        access said application metadata descriptive of said application over said network, said metadata descriptive of said application being different from application data configured to launch said application,
        determine, based on said metadata, whether available memory and processor resources are sufficient to launch said application on said media content processing subsystem, and
        perform at least one action based on said determination.

15. The system of claim 14, further comprising a resident service access facility configured to provide a user with access to at least one of a media service, media content, a communication service, and communication content.

16. The system of claim 15, wherein said resident service access facility is further configured to provide said user with one or more graphical user interfaces configured to allow a user to access said at least one of said media service, said media content, said communication service, and said communication content.

17. The system of claim 16, wherein said one or more graphical user interfaces comprises at least one of an interactive program guide, a menu, and a media recording graphical user interface.

18. An apparatus comprising:
- a set-top box including at least one processor and a computer-readable medium communicatively coupled to said at least one processor;
- an application launcher module tangibly embodied on said computer-readable medium, said application launcher module configured to direct said at least one processor to:
  - detect, from a set-top box user, a request to launch an application,
  - access metadata for said application over said network in response to said request to launch said application, said metadata for said application being different from application data configured to launch said application,
  - determine, based on said metadata, whether available memory and processor resources of said set-top box are sufficient to launch said application with said application launcher module, and
  - when said available memory and processor resources are determined to be sufficient to launch said application, launch said application on said set-top box.

19. The apparatus of claim 18, wherein said launching of said application on said set-top box comprises:
- downloading said application data over said network;
- loading said application data; and
- initiating execution of said application on said set-top box.

20. The apparatus of claim 18, wherein said application is one of a search tool, an interactive game, a user interface, a widget, a standalone software program, and a software program for use in an operation of a resident service access facility.

* * * * *